(12) United States Patent
Huang

(10) Patent No.: US 7,946,876 B1
(45) Date of Patent: May 24, 2011

(54) SMART CARD HOLDER FOR PORTABLE ELECTRONIC DEVICE

(75) Inventor: Yu-Chia Huang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 0 days.

(21) Appl. No.: 12/791,058

(22) Filed: Jun. 1, 2010

(30) Foreign Application Priority Data

Dec. 25, 2009 (CN) .......................... 2009 1 0312268

(51) Int. Cl.
*H01R 13/62* (2006.01)

(52) U.S. Cl. ....................................... 439/329; 439/630

(58) Field of Classification Search ................. 439/326, 439/630, 631
See application file for complete search history.

(56) References Cited

U.S. PATENT DOCUMENTS

| | | | | |
|---|---|---|---|---|
| 5,933,328 A * | 8/1999 | Wallace et al. | ............... | 361/737 |
| 6,468,101 B2 * | 10/2002 | Suzuki | .......................... | 439/326 |
| 6,471,550 B2 * | 10/2002 | Maiterth et al. | ............... | 439/631 |
| 6,896,548 B2 * | 5/2005 | Scuteri et al. | ............... | 439/541.5 |
| 7,029,306 B2 * | 4/2006 | Bilcauu et al. | ................ | 439/326 |

* cited by examiner

*Primary Examiner* — Hae Moon Hyeon
(74) *Attorney, Agent, or Firm* — Steven M. Reiss

(57) ABSTRACT

A smart card holder includes a connector, two rocker arms and a latching member. The connector includes a connecting plate having a plurality of contacts formed thereon. The two rocker arms respectively rotatably connect an end of the connecting plate. The latching member includes a plate portion and two latching units forming on opposite two surfaces of the plate portion, each latching unit latches a smart card. The latching member rotatably connects to the two rocker arms. When the latching member attaches on the connecting plate, the smart card installs on the latching unit facing the connecting plate correspondingly resisting against the contacts, the other smart card can resist against the contacts the by rotating of the latching member.

14 Claims, 5 Drawing Sheets

SMART CARD HOLDER FOR PORTABLE ELECTRONIC DEVICE

BACKGROUND

1. Technical Field

The present disclosure relates to smart card holders, particularly, to a smart card holder which is used in a portable electronic device.

2. Description of Related Art

Portable electronic devices such as mobile phones typically employ smart cards such as SIM (Subscriber Identity Module) cards, for example for storing user information. A smart card holder is installed in the portable electronic device to hold the smart cards.

The smart card holder typically includes a latching groove defined in a main body of the portable electronic device to receive a smart card. When the portable electronic device needs to carry two smart cards, two latching grooves are generally defined in the main body. However, the configuration of two latching grooves takes up extra space within the main body.

Therefore, there is room for improvement within the art.

BRIEF DESCRIPTION OF THE DRAWINGS

Many aspects of the smart card holder for portable electronic devices can be better understood with reference to the following drawings. The components in the drawings are not necessarily to scale, the emphasis instead being placed upon clearly illustrating the smart card holder for portable electronic devices. Moreover, in the drawings, like reference numerals designate corresponding parts throughout the several views.

DETAILED DESCRIPTION

Figure 1:
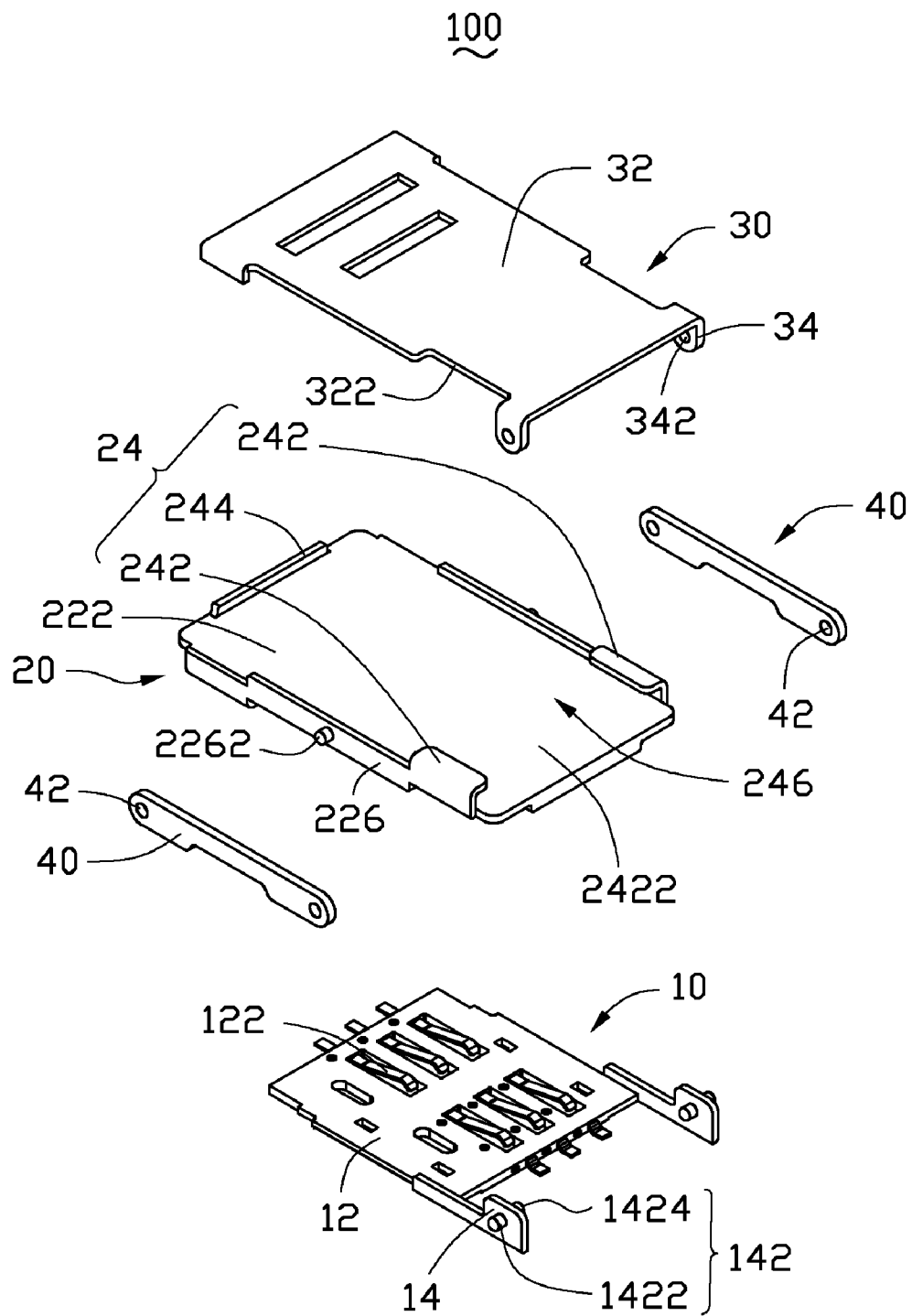
FIG. 1 is an exploded, isometric view of a smart card holder, in accordance with an exemplary embodiment.
Figure 2:
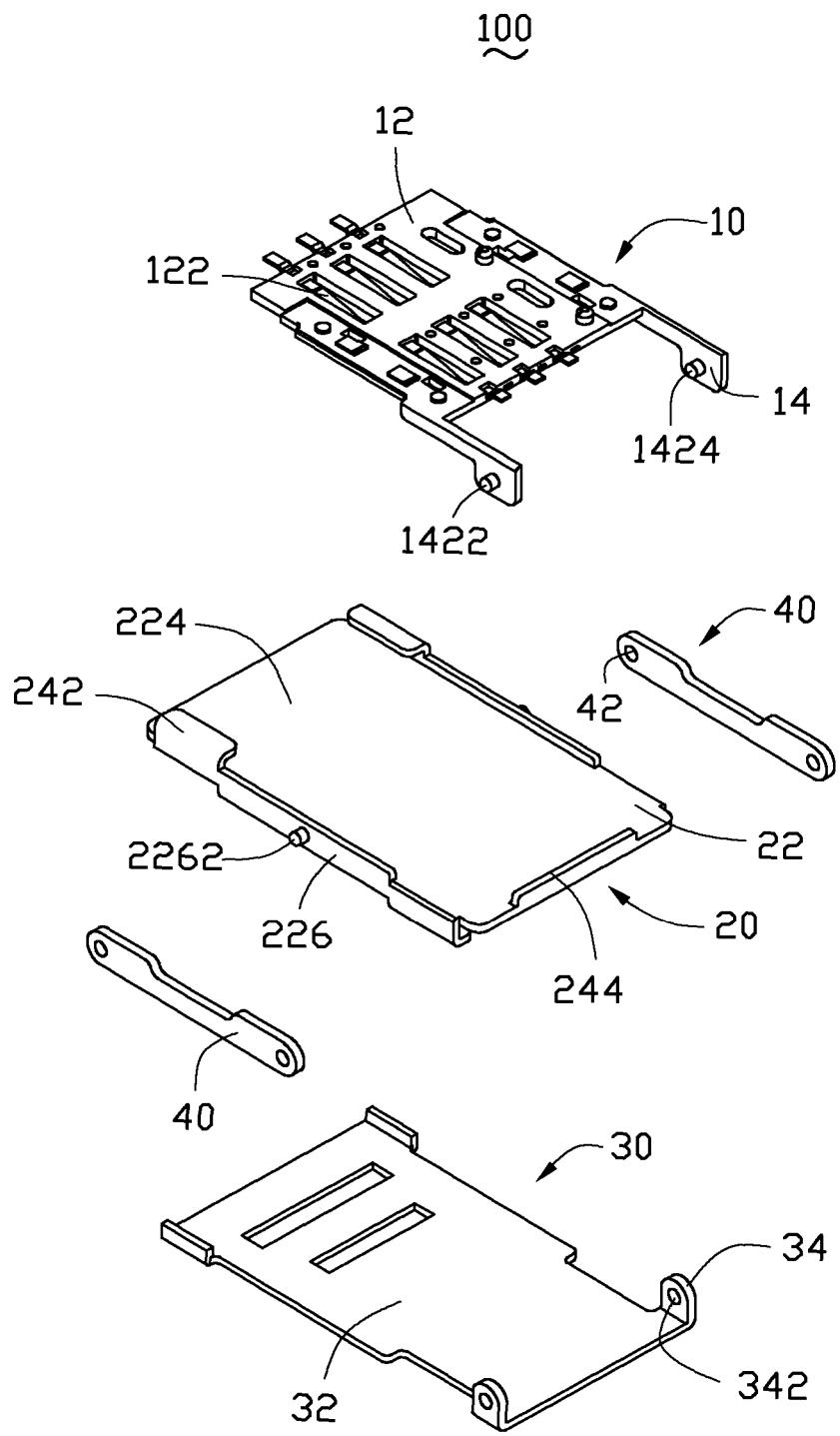
FIG. 2 is similar to FIG. 1, but shown from another aspect.

FIG. 1 shows an exemplary embodiment of a smart card holder 100 used in mobile phones and other portable electronic devices for holding a smart card. The smart card holder 100 includes a connector 10, a latching member 20, a cover 30, and two rocker arms 40.

The connector 10 includes a connecting plate 12 and two parallel connecting arms 14. The connecting arms 14 are oppositely secured at an end of the connecting plate 12. The connecting plate 12 has a plurality of elastic contacts 122 substantially arranged in a matrix. The connecting arm 14 has a first shaft 142 laterally extending towards two sides of the connecting arm 14 to form an outer section 1422 and an inner section 1424.

The latching member 20 is generally rectangular and includes a plate portion 22 and two latching units 24 arranged on the opposite surfaces of the plate portion 22. The plate portion 22 has an upper surface 222, an opposite lower surface 224 and two side surfaces 226. The upper surface 222 and the lower surface 224 each include a latching unit 24. The two side surfaces 226 have a second shaft 2262 protruding laterally from the center of the side surface 226. Each latching unit 24 includes two latching flanges 242 and a resisting flange 244. The pairs of latching flanges 242 are formed at the two sides of the upper surface 222 and the lower surface 224, respectively. The pair of latching flanges 242 are bent towards each other and cooperatively define an inserting mouth 2422 for inserting the smart card. The resisting flange 244 respectively forms on an end of the upper surface 222 and the lower surface 224, and the resisting flange 244 is positioned opposite to the inserting mouth 2422. Accordingly, the two latching flanges 242, the resisting flange 244, and the plate portion 22 enclose a receiving area 246 to receive the smart card. The latching unit 24 arranged on the lower surface 224 symmetrically corresponds with the other latching unit 24, arranged on the upper surface 222 about the second shaft 2262.

The cover 30 includes a base plate 32, and two supporting arms 34 at an end of the base plate 32. The base plate 32 defines a cutout 322 at each side to correspondingly engage with the latching flange 242 of the latching member 20. The two supporting arms 34 oppositely form at two sides of the base plate 32 and are positioned substantially perpendicularly with the base plate 32. Each supporting arm 34 defines a connecting hole 342 to rotatably receive the first shaft 142.

The rocker arm 40 is elongated for rotatably connecting the connector 10 and the latching member 20. The rocker arm 40 defines an engaging hole 42 at each end to receive the first shaft 142 and the second shaft 2262.

Figure 3:
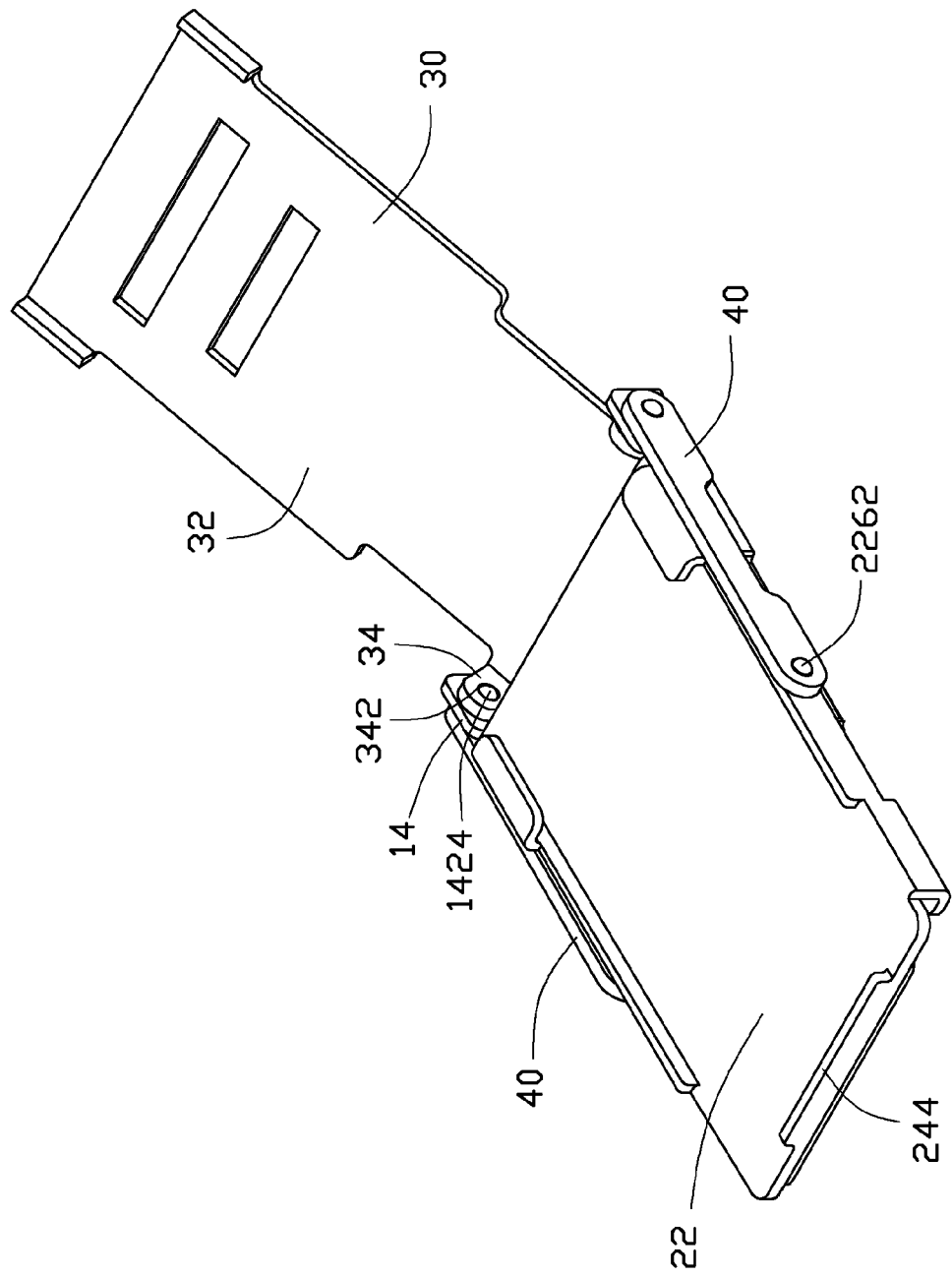
FIG. 3 is an assembled isometric view of the smart card holder shown in FIG. 1.

Referring to FIG. 3, to assemble the smart card holder 100, the latching member 20 is placed on the connector 10. The plate portion 22 of the latching member 20 is stacked on the connecting plate 12 and is located between the two connecting arms 14. The latching flanges 242 and the resisting flange 244 resist against the connecting plate 12. The lower surface 224 of the plate portion 22 has space with the contacts 122 to receive the smart card. The two rocker arms 40 are rotatably assembled to connect the latching member 20 and the connector 10. The two engaging holes 42 of the rocker arms 40 receive the outer section 1422 of the first shaft 142 and the second shaft 2262 therein. Accordingly, the rocker arms 40 can rotate about the first shaft 142 and the latching member 20 can rotate about the second shaft 2262. Then, the cover 30 is rotatably assembled with the connector 10, the two connecting holes 342 of the supporting arms 34 respectively receive the inner section 1424 of the first shaft 142 therein, so the cover 30 can rotate relative to the connector 10.

Figure 4:
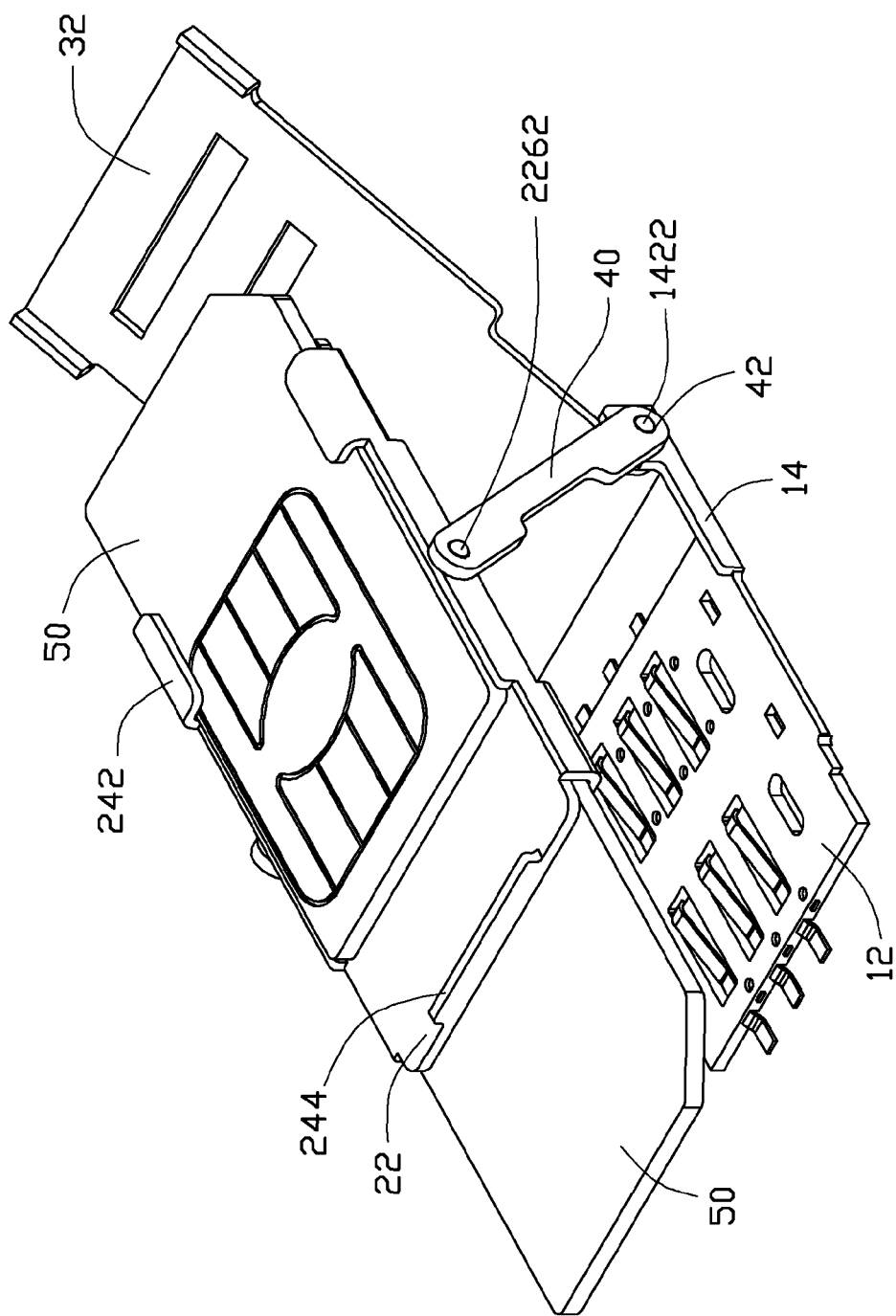
FIG. 4 is an isometric view of the smart card holder shown in FIG. 3 during installation of smart cards.
Figure 5:
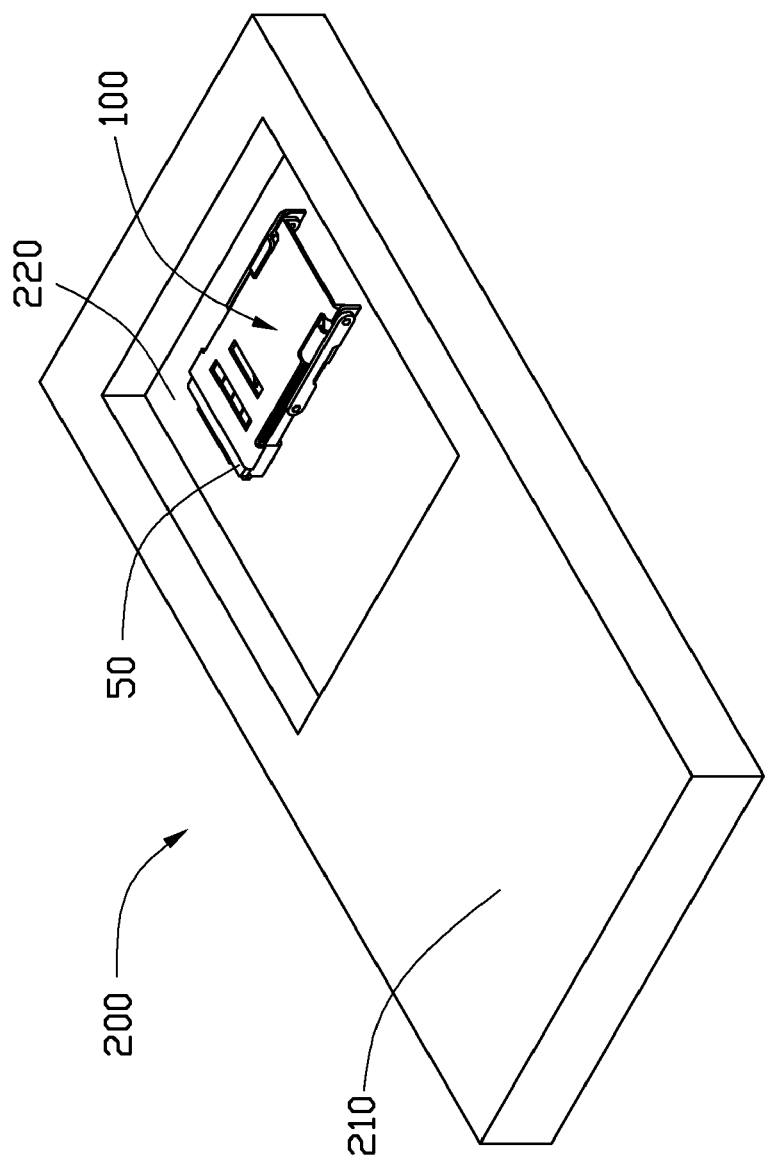
FIG. 5 is an isometric view of the smart card holder shown in FIG. 3 applied in a portable electronic device.

Referring to FIG. 4, to installation of the two smart cards 50 in the smart card holder 100, the cover 30 rotates relative to the connector 10 and is opened, and the two rocker arms 40 rotate to raise the latching member 20. The two cards 50 can be inserted into the receiving area 246 from the inserting mouth 2422, the two latching flanges 242 and the resisting flange 244 can hold each smart card 50. After the two smart cards 50 are installed, the two rocker arms 40 rotate back to the original position, and the cover 30 rotates to cover the latching member 20. Thus, the smart cards 50 contacting the contacts 122 of the connecting plate 12 can be electronically connected to an internal circuit of the portable electronic device 200. To use the other smart card 50 without touching the contacts 122, open the cover 30 and rotate the rocker arms 40, and rotate the latching member 20 about the second shaft 2262 until the other smart card 50 faces the contacts 122. After that, the rocker arms 40 return to the original positions and the cover 30 covers the latching member 20 with the other smart card 50 connecting with the contacts 122.

FIG. 6 shows the smart card holder 100 applied to the portable electronic device 200. The device 200 includes a main body 210 defining a receiving groove 220 for assembling the smart card holder 100 therein. The contacts 122 of the connector 10 electronically connect with the internal circuit, and the smart card 50 resists with the contacts 122. To use the other smart card 50, the latching member 20 is rotated to enable the other smart card 50 to resist the contacts 122, achieving an easy exchange between the two smart cards 50.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A smart card holder comprising:
    a connector including a connecting plate having a plurality of contacts formed thereon;
    two rocker arms respectively rotatably connecting an end of the connecting plate;
    a latching member rotatably connecting to the two rocker arms, the latching member including a plate portion and two latching units formed on opposite surfaces of the plate portion, each latching unit being used to latch a smart card;
    wherein the latching member attaches to the connecting plate, the smart card assembled on the latching unit facing the connecting plate engages with the contacts, the other smart card can engages with the contacts by rotating the latching member.

2. The smart card holder as claimed in claim 1, wherein the connector includes two opposite connecting arms forming one end of the connecting plate, each connecting arm forms a first shaft, the first shaft extends laterally towards two sides of the connecting arm to form an outer section and an inner section.

3. The smart card holder as claimed in claim 2, wherein the rocker arm defines an engaging hole at each end, the plate portion protrudes laterally two coaxial second shafts from two side surfaces, the two engaging holes of the rocker arm respectively rotatably receive the outer section of the first shaft and the second shaft therein.

4. The smart card holder as claimed in claim 3, wherein the smart card holder includes a cover, the cover includes a base plate and two supporting arms at an end of the base plate, each supporting arm defines a connecting hole to rotatably receive the inner section of the first shaft to make the cover rotatable relative to the connector.

5. The smart card holder as claimed in claim 4, wherein the plate portion includes an upper surface and a lower surface, the two latching units are assembled on the upper surface and the lower surface respectively, and the two latching units are correspond symmetrical about the second shaft.

6. The smart card holder as claimed in claim 5, wherein the latching unit includes two latching flanges and a resisting flange, the two latching flanges formed at two sides of the plate portion; the resisting flange forms an end of the plate portion, the two latching flanges, the resisting flange and the plate portion enclose a receiving area to receive a smart card.

7. The smart card holder as claimed in claim 6, wherein the base plate of the cover defines a cutout at each side to correspondingly engage with the latching flange of the latching member.

8. A portable electronic device comprising:
    a main body defining a receiving groove;
    a smart card holder assembled in the receiving groove;
    wherein the smart card holder includes a connector, two rocker arms and a latching member; the connector includes a connecting plate having a plurality of contacts formed thereon; the two rocker arms respectively rotatably connect an end of the connecting plate; the latching member includes a plate portion and two latching units formed on opposite surfaces of the plate portion, each latching unit latches a smart card; the latching member rotatably connecting to the two rocker arms; when latching member attaches on the connecting plate, the smart card assembled to the latching unit facing the connecting plate engages with the contacts, the other smart card can engage with the contacts by rotating the latching member.

9. The portable electronic device as claimed in claim 8, wherein the connector includes two opposite connecting arms forming an end of the connecting plate, each connecting arm forms a first shaft, the first shaft extends laterally towards two sides of the connecting arm to form an outer section and an inner section.

10. The portable electronic device as claimed in claim 9, wherein the rocker arm defines an engaging hole at each end, the plate portion protrudes laterally two coaxial second shafts from two side surfaces, the two engaging holes of the rocker arm rotatably receive the outer section of the first shaft and the second shaft therein.

11. The portable electronic device as claimed in claim 10, wherein the smart card holder includes a cover, the cover includes a base plate and two supporting arms at an end of the base plate, each supporting arm defines a connecting hole to rotatably receive the inner section of the first shaft to make the cover rotatable relative to the connector.

12. The portable electronic device as claimed in claim 11, wherein the plate portion includes an upper surface and a lower surface, the two latching units are assembled on the upper surface and the lower surface respectively, and the two latching units are correspond symmetrical about the second shaft.

13. The portable electronic device as claimed in claim 12, wherein the latching unit includes two latching flanges and a resisting flange, the two latching flanges formed at two sides of the plate portion, the resisting flange forms an end of the plate portion; the two latching flanges, the resisting flange and the plate portion enclose a receiving area to receive a smart card.

14. The portable electronic device as claimed in claim 13, wherein the base plate of the cover defines a cutout at each side to correspondingly engage with the latching flange of the latching member.

* * * * *